March 3, 1964  R. W. MORLING  3,122,935
CONVEYOR BELT PULLEY
Filed Sept. 5, 1961
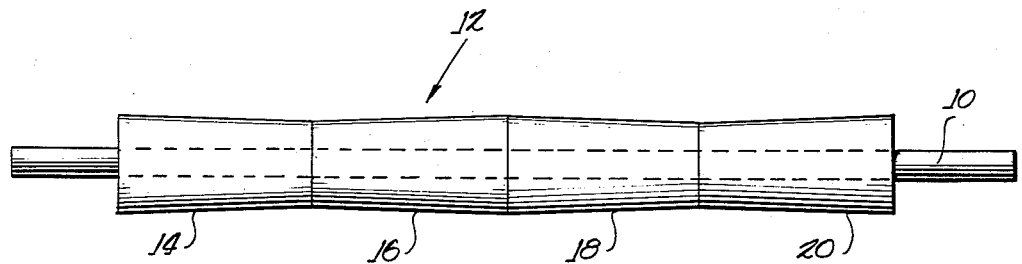
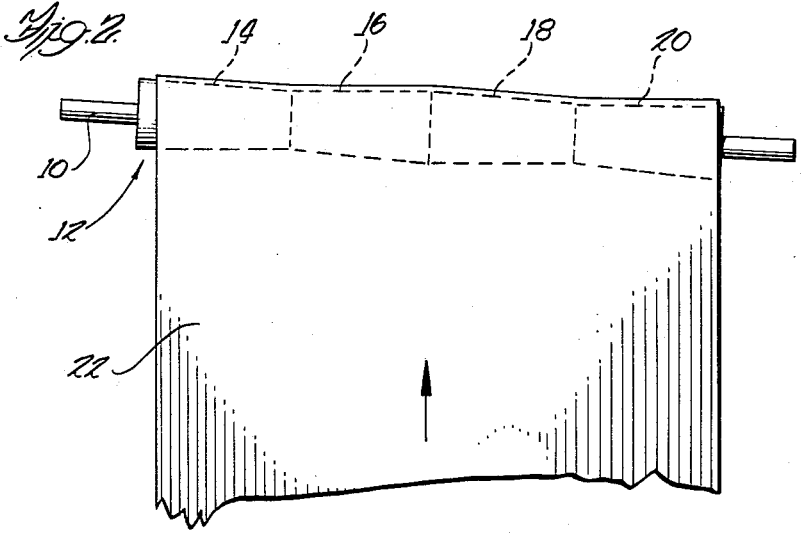
INVENTOR
Roy W. Morling
Paul O. Pippel
ATTORNEY United States Patent Office 3,122,935
Patented Mar. 3, 1964

3,122,935
CONVEYOR BELT PULLEY
Roy W. Morling, Elmhurst, Ill., assignor to International Harvester Company, Chicago, Ill., a corporation of New Jersey
Filed Sept. 5, 1961, Ser. No. 135,819
6 Claims. (Cl. 74—241)

This invention relates to self-centering pulleys or rollers for use with belt conveyors. More particularly, it deals with an improvement in the crowning of a conveyor pulley having a high belt face-to-pulley diameter ratio in order to enhance its self-centering characteristics.

While pulleys of large diameter generally are used for conventional power transmission in order to provide greater torque and power transmisison capacity, the use of pulleys having a high face-to-diameter ratio generally increases the carrying capacity of a conveyor. The problem of keeping the belt on the pulleys is of greater import when pulleys having a high face-to-diameter ratio are used because the given allowable belt runoff preferably should be a relatively small percentage of the face width for this type of pulley. Heretofore, belt runoff has been compensated for by an increase in the crown on the face of the pulley. This results in a differential tension in the belt, causing the center to bulge with respect to the edges and the belt lacing to be torn, thus narrowing its effective face width. The relatively lower tension at the edges of the belt results in a loss of gripping surface friction between the belt and the pulley in these areas. A tension of relatively greater magnitude is thus required in the central area of the belt in order to transmit a given load. The effectiveness of crowning to correct for belt runoff is decreased as a result of this loss of surface friction. Where the inbalance of lateral forces due to the slope of the conventional convex or flat V-shaped crown and the position of the belt thereon do not compensate for this loss of surface friction, it appears possible that a conventional crown will increase the tendency for belt runoff.

Accordingly, it is an object of this invention to provide a pulley which will improve the tracking ability of the conveyor belt thereon.

Another object of this invention is to provide a pulley which will reduce the differential tension in a conveyor belt.

A further object of this invention is to provide a pulley which will increase the load-carrying capacity of a conveyor belt.

An additional object of this invention is to provide a pulley having a normally crowned central portion and segments of reverse crowns at its end portions.

Further and additional objects of this invention will be more clearly understood by referring to the description and drawing, in which:

FIGURE 1 is an elevation showing one form of the improved self-centering pulley; and FIGURE 2 is an elevation showing the pulley in engagement with a conveyor belt.

Turning now to FIGURE 1, it will be seen that the shaft 10 is mounted on the pulley or roller 12. The pulley 12 has a face comprising the segments 14, 16, 18, and 20 of varying slopes. Inner segments 16 and 18 form an intermediate portion of pulley 12 and have annular surfaces sloped to form at least one crown. Outer segments 14 and 20 form the end portions of pulley 12. The slopes of the surfaces of segments 14 and 20 are opposed to those of segments 16 and 18 and form sections of reverse crowns. It is to be understood that the relative size of each segment and the degree of slope of one surface relative to another may vary in accordance with operating needs.

Under ordinary operating conditions, belt 22 shown in FIGURE 2 may tend to run off the end of pulley 12. This results in a decrease in the effective gripping surface friction between segment 20 of pulley 12 and one edge of belt 22. Although the slope of segment 20 tends to force belt 22 to run off the end of pulley 12, the opposed slope of segment 14 of pulley 12 counteracts this tendency. The surface friction between segment 14 and belt 22 being greater than that between segment 20 and belt 22, the belt will be realigned centrally of pulley 12. Utilization of the surface friction at the edges of the belt result in less of an internal tension differential between the edges and the central portion thereof. Thus it will be seen that the opposed slopes, in conjunction with one or more intermediate crowns, form a pulley having a face acting to disperse the power transmisison and load-carrying capacity more evenly throughout the entire width of its associated belt.

While the preferred embodiment of my invention has been shown and described, other adaptations and modifications may be made without departing from the scope of the following claims.

I claim:

1. A pulley adapted for use with a conveyor belt, said pulley comprising a unitary rim having a central and two end portions, the surface of said central portion being formed in the shape of at least one crown, the surface of each of said end portions having a slope formed in the shape of a partial crown, whereby to correct for the runoff of an associated conveyor belt.

2. A pulley adapted for use with a conveyor belt comprising a unitary rim having a plurality of intermediate and outer segments, the surfaces of said outer segments sloping from a point of greater diameter toward a point of lesser diameter in an area inwardly of the outer ends of said outer segments, the surfaces of said intermediate segments sloping toward another point of greater diameter in an area inwardly of said point of lesser diameter.

3. A unitary pulley adapted for use with a conveyor belt comprising two intermediate and two outer pulley segments having smooth annular surfaces, the surfaces of said outer segments sloping from a first point of greater diameter at the outer ends thereof toward a point of lesser diameter in an area inwardly of said outer ends, the surfaces of said intermediate segments sloping from said point of lesser diameter toward a second point of greater diameter in an area inwardly of said point of lesser diameter.

4. A unitary pulley adapted for use with a conveyor belt comprising two intermediate and two outer coaxial pulley segments of equal face width and having smooth annular surfaces, the surfaces of said outer segments sloping from a first point of greater diameter at the outer ends thereof toward a point of lesser diameter in an area inwardly of said outer ends, the surfaces of said intermediate segments sloping from said point of lesser diameter toward a second point of greater diameter in an area inwardly of said point of lesser diameter.

5. The pulley of claim 4, wherein said first point of greater diameter and said second point of greater diameter are equal in diameter.

6. An unitary pulley adapted for use with a conveyor belt comprising two intermediate and two outer coaxial pulley segments having smooth annular surfaces, the surfaces of said outer segments sloping from a first point of greater diameter at the outer ends thereof toward a point of lesser diameter in an area inwardly of said outer ends, the surfaces of said intermediate segments sloping from said point of lesser diameter toward a second point equal in diameter to said first greater diameter in an area inwardly of said point of lesser diameter.

References Cited in the file of this patent

UNITED STATES PATENTS

| | | |
|---|---|---|
| 994,910 | Duesterhoff | June 13, 1911 |
| 2,822,169 | Lorig | Feb. 4, 1958 |